ional® United States Patent [19]
Tuhro

[11] Patent Number: 4,555,732
[45] Date of Patent: Nov. 26, 1985

[54] IMAGE SENSOR CORRECTION SYSTEM
[75] Inventor: Richard H. Tuhro, Webster, N.Y.
[73] Assignee: Xerox Corporation, Stamford, Conn.
[21] Appl. No.: 592,128
[22] Filed: Mar. 22, 1984
[51] Int. Cl.$^4$ .............................................. H04N 5/14
[52] U.S. Cl. ..................................... 358/213; 358/41; 377/63
[58] Field of Search ................. 358/212, 213, 41, 241, 358/113; 357/24 LR; 377/57, 62, 63

[56] References Cited
U.S. PATENT DOCUMENTS

| | | | |
|---|---|---|---|
| 4,216,503 | 8/1980 | Wiggins | 358/280 |
| 4,298,887 | 11/1981 | Rode | 358/113 |
| 4,432,017 | 2/1984 | Stoffel et al. | 358/213 |
| 4,438,457 | 3/1984 | Tandon et al. | 358/213 |
| 4,475,125 | 10/1984 | Esser et al. | 358/213 |
| 4,509,181 | 4/1985 | Saueb | 377/63 |

Primary Examiner—Forester W. Isen
Assistant Examiner—Robert G. Lev
Attorney, Agent, or Firm—Frederick E. McMullen

[57] ABSTRACT

Sensor correction circuit for maintaining offset voltages in the shift registers of a multiple channel image sensor substantially equal having a pair of control gates to permit sampling the current offset voltages in the shift registers of each channel, a pair of capacitors for storing the offset voltage samples in each channel; a clock for actuating the control gates in preset timed relation between scan lines to sample and store the current shift register offset voltages on the capacitors; and an amplifier for amplifying any difference between the offset voltage samples held by the capacitors to provide an adjusted potential for balancing any differences between the shift registers.

9 Claims, 4 Drawing Figures

IMAGE SENSOR CORRECTION SYSTEM

The invention relates to image sensors, and more particularly, to a sensor correction system for maintaining the offset voltages in the image sensor shift registers substantially equal.

Recent developments in image sensors such as a Charge Coupled Devices (CCD), driven by the quest for higher scan speeds and greater resolution, have led to development of image sensors employing multiple banks or channels of parallel in/serial out analog shift registers. Typical of these is the quadrilinear image sensor employing four shift registers arranged in two shift register banks or channels on either side of a linear array of photosensitive elements. In image sensors of this type, the image signal on every fourth photosensitive element is transferred to one shift register. Thereafter, the image signals in the shift registers are clocked serially along the shift register channels and, through multiplexing of the shift register outputs, delivered as a serial stream to a common output.

However, the use of multiple shift register banks in image sensors, while enhancing scan speeds and resolution, necessitates, if accurate image signal representations are to be obtained, that the banks of shift registers be in balance. For, as will be understood, there may be an internal offset voltage generated in shift registers, and since each shift register may have slightly different individual operating characteristics, there can result different offset voltages in each shift register bank. Since the offset voltages are added to and become part of the image signal output by the CCD, there are normally means, provided at some point downstream of the CCD, to remove the offset voltage component and provide image signals that accurately reflect the image content. However, where the offset voltages vary from one image signal to the next, removal of the offset voltage component becomes difficult. And in this context, it is not unusual to see discrepancies in offset voltages between shift register banks ranging up to as much as 300 mv whereas, if visually observable differences in the image are to be prevented, shift register to shift register offset voltage should be substantially equal.

While discrepancies in offset voltages between banks of shift registers such as alluded to above might be corrected by subsequent correction on a pixel by pixel basis, this type of correction only adds excessive and unjustified complexity to the system since the problem being corrected is basically nothing more than fixed pattern noise. A variable voltage source might also be used, with the voltage being adjusted initially at the factory or installation to provide for a desired minimum offset. However, this system is of dubious value since it only provides correction at the time of assembly. Subsequent use and aging of the image sensor components as well as environmental conditions such as temperature may cause drift and change the offset voltage levels, leaving the aforementioned fixed correction unable to maintain the requisite degree of balance between the shift register offset voltages.

The invention relates to an apparatus for correcting the shift register offset voltages in an image sensor, the image sensor having a plurality of photosensitive elements disposed in at least one linear array, at least two discrete banks of parallel in/serial out shift registers to receive image signals from the photosensitive elements in spaced succession; and a voltage source for balancing the offset voltages of the shift registers; the improvement comprising: means to provide signals representing the current offset voltage in the shift registers of each bank; means for comparing the signals to provide a control signal; and means for adjusting the voltage source in response to the control signal to balance the offset voltages in each shift register bank with one another.

The invention further relates to a method for correcting offset voltages in the shift registers of an image sensor, there being a source of reference potential coupled to at least one of the shift registers for use in equating the offset voltage of the shift registers with each other, comprising the steps of: producing a control signal representing the current offset voltage of each shift register; comparing the control signals; and adjusting the reference potential input to the one shift register so that the difference between the control signals is substantially zero.

IN THE DRAWINGS

Figure 1:
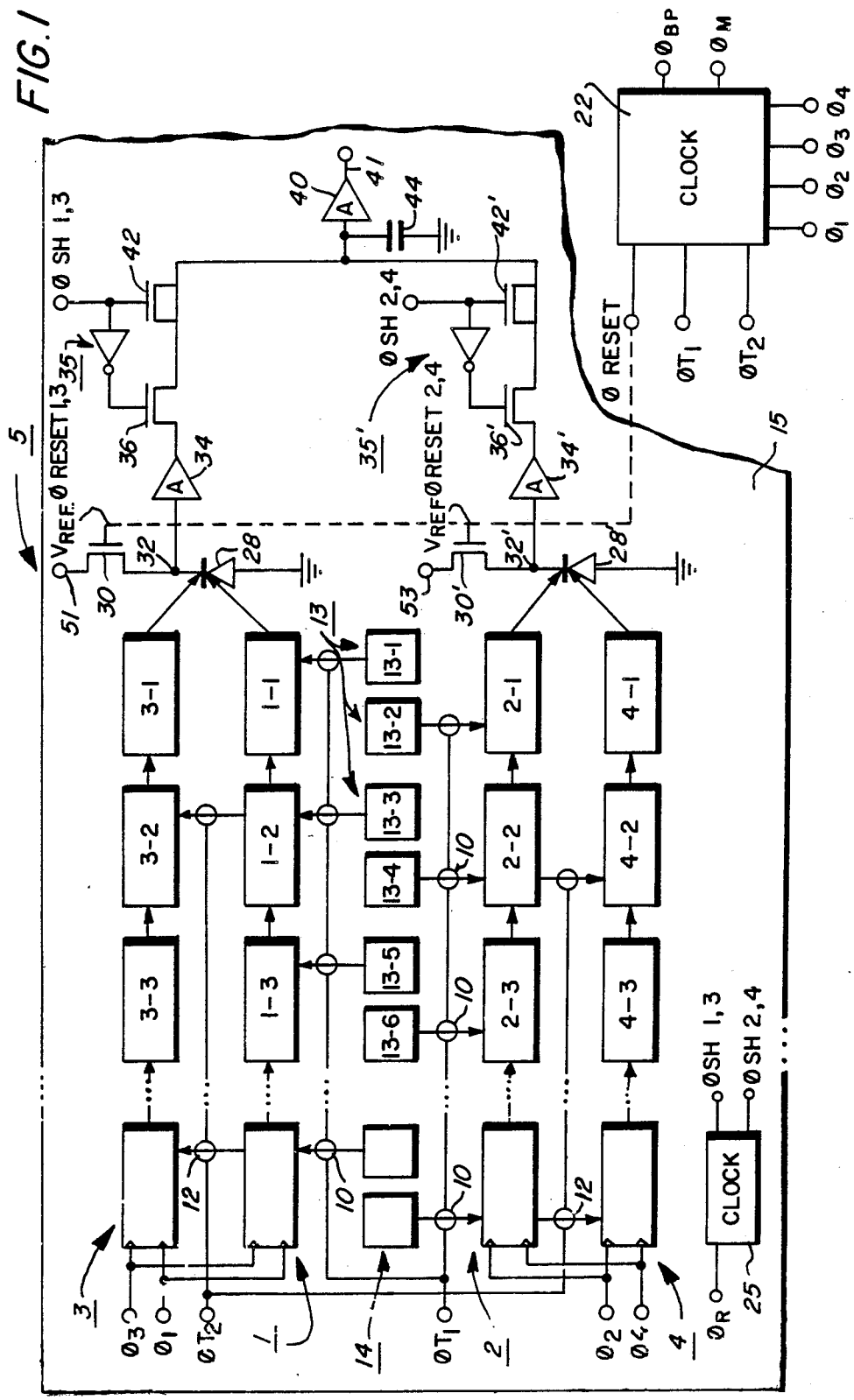
FIG. 1 is a schematic view of an exemplary quadrilinear type CCD image sensor adapted to incorporate the sensor correction system of the present invention.
Figure 2:
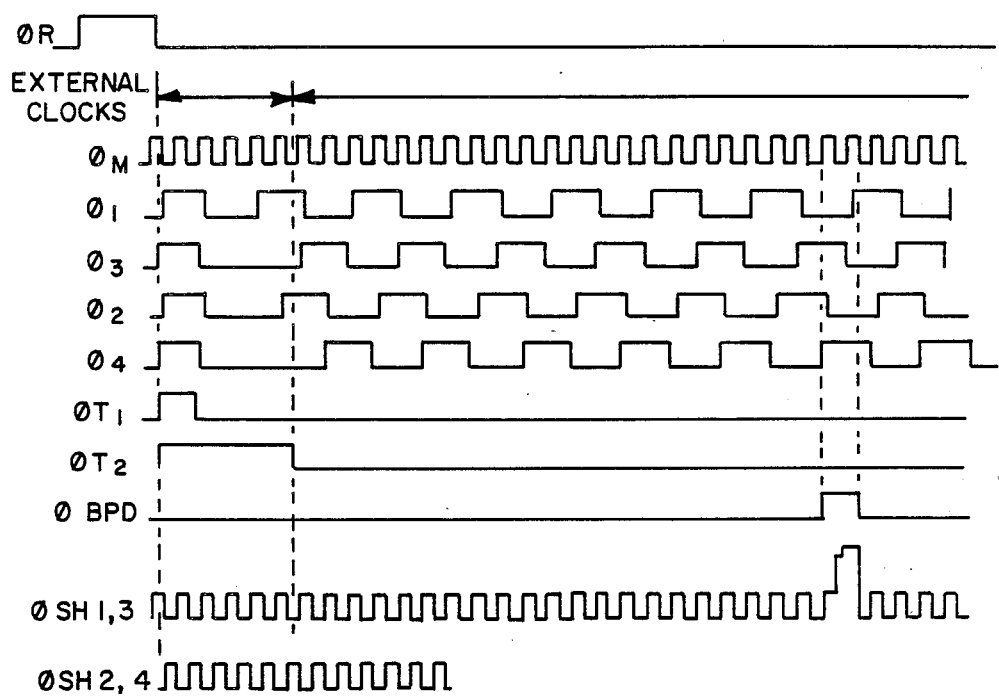
FIG. 2 is a timing chart depicting the operational sequence of the CCD image sensor shown in FIG. 1.
Figure 3:
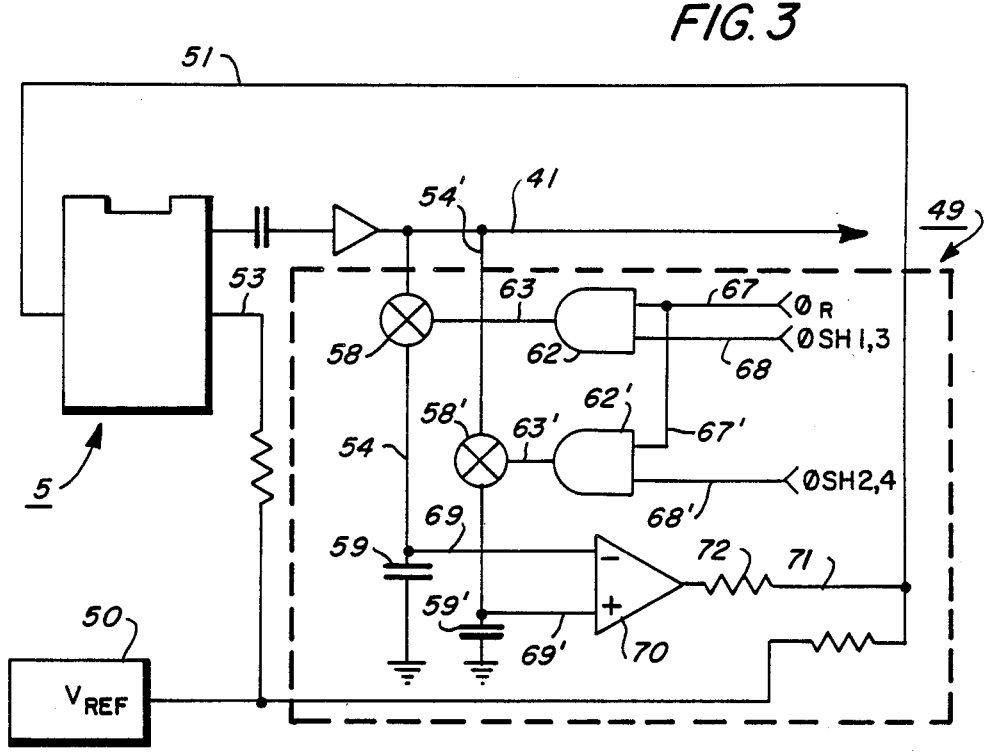
FIG. 3 is a logic schematic of the operating circuit for the sensor correction system of the present invention.

Referring to FIGS. 1–3, a solid state imager or scanner in the form of a quadrilinear Charge Coupled Device (CCD) of the kind adapted to incorporate the sensor correction system of the present invention is there shown and designated by the numeral 5. While the sensor correction system of the present invention is illustrated and described hereinbelow in connection with CCD 5, it will be understood that the invention is not to be so limited and may instead be used with any imager or sensor employing separate operating channels.

CCD 5 has a plurality of image sensors or photosensitive elements arranged in a linear row or array 14 on a single silicon integrated circuit chip 15. CCD 5 serves, in an image system of the type shown in U.S. Pat. No. 4,122,352 for example, to convert the graphical image of an original document to a series of electronic image signals or pixels. Where for example photosensitive elements comprise charge coupled cells 13 as in CCD 5, exposure to the illuminated document generates a charge proportional to the luminous energy reflected from the original document. Exposure is taken over a preset time interval termed integration rate. Following integration, the charges in the cells are transferred to the phase gates of analog, parallel in/serial out shift registers 1, 2, 3, 4 through first and second transfer gate gate arrays 10, 12 respectively.

Shift registers 1 and 3, which together form an upper shift register bank or channel, are disposed on one side of the sensor array 14 while shift registers 2 and 4, which together form a lower shift register bank or channel, are located one the other side of the sensor array. During transfer, the transfer gate array 10, on clock pulse $\phi T_1$ transfers the charges from the odd numbered cells 13 to the phase gates of shift register 1 and the charges from the even numbered cells to the phase gates of shift register 2. On clock pulse $\phi T_2$, transfer gate array 12 transfers the charges in every other phase gate of shift registers 1 and 2 to the corresponding phase gates of shift registers 3, 4. As a result, the image signal from every fourth cell 13 in sensor array 14 is transferred to every fourth shift register phase gate (i.e. from cells 13-1, 13-5, 13-9, . . . ; 13-2, 13-6, 13-10, . . . ; 13-3, 13-7, 13-11, . . . ; and 13-4, 13-8, 13-12, . . . to phase gates 1-1, 1-3, 1-5, . . . ; 2-1, 2-3, 2-5, . . . ; 3-2, 3-4, 3-6, . . . ; and 4-2, 4-4, 4-6, . . . respectively).

An external pixel clock 22 provides suitable integrating clock pulses (not shown) during which the charges representative of the document image being scanned accumulate in the cells 13 and transfer clock pulses $\phi T_1$, $\phi T_2$ for actuating transfer gate arrays 10, 12 respectively to transfer the charges from cells 13 to the shift register phase gates. Clock 22 also provides phase shift pulses $\phi_1$, $\phi_2$, $\phi_3$, $\phi_4$ for shifting the image charges serially along shift registers 1, 2, 3, 4 (i.e. from left to right in FIG. 1), master clock pulses $\phi M$, reset pulses $\phi$ RESET, and bad pixel delete clock $\phi_{BP}$, the latter serving to inhibit sampling in the case of a bad cell so that the charge in the previous cell will be held and used as the signal from the bad cell. On chip clock 25 provides restore pulses $\phi R$ and complementary sample and hold clock pulses $\phi SH_{1,3}$ and $\phi SH_{2,4}$.

Following transfer of the image charges to every second phase gate in shift registers 1, 2, 3, 4, the charges are shifted by means of phase shift pulses $\phi_1$, $\phi_2$, $\phi_3$, $\phi_4$ serially along registers 1, 2, 3, 4 (i.e. from left to right in FIG. 1) and from the shift register outputs to output gates 28, 28'. Output gates 28, 28' are preset to a predetermined reference (Vref) through reset transistors 30, 30' respectively, transistors 30, 30' being enabled between image signals by reset pulses $\phi$ RESET. Reference potential (Vref) is derived from a fixed potential source 50 (shown in FIG. 3), the level of which to one of the output gates 28, 28' is controlled by the sensor correction circuit of the present invention as will appear. Source follower amplifiers 34, 34', which act as buffers for the raw video signals, detect changes in voltage on floating diffusion nodes 32, 32' between output gates 28, 28' and transistors 30, 30' respectively. Sample and Hold (SH) circuit 35, 35' have transistors 36, 36' respectively to sample the raw video, transistors 36, 36' being selectively enabled by non-overlapping phase clock pulses $\phi SH_{1,3}$ and $\phi SH_{2,4}$ to pass the signals in serial fashion to output amplifier 40 and line 41.

To accommodate bad pixels, the non-overlapping clock signal $\phi SH_{1,3}$ or $\phi SH_{2,4}$ applied to transistor 36 or 36' is maintained for a duration such that the signal preceding the bad pixel is transmitted in substitution for the bad pixel.

Transistors 42, 42' together with capacitor 44 operate as a pulse filter to provide effective sample and hold charge cancellation and ensure a flat video level.

In CCD's such as CCD 5, a potential, termed an offset voltage, may be generated in the CCD shift registers. Typically, the offset voltages are found to range from as little as 4 mv to as high as 300 mv. Since any offset voltage present is, by the operation of the CCD, added to the image signal, there is commonly provided downstream of the CCD, circuitry (not shown) to remove the offset voltage and provide an image signal that is an accurate representation of the scanned image content. Where as in the case of CCD's such as CCD 5, multiple banks of shift registers are used, the offset voltage in one shift register bank may be different from the offset voltage in the other shift register bank which in turn renders subsequent attempts to remove or neutralize the offset voltage difficult.

Referring now to FIG. 3, the sensor correction circuit of the present invention, identified generally by the numeral 49, is there shown. To control offset voltages, image signal output in line 41 is tapped by lines 54, 54'. Lines 54, 54' are coupled through analog multiplexers 58, 58' and signal storing capacitors 59, 59' respectively to a common potential such as ground. The control terminals of multiplexers 58, 58' are coupled to the output terminals of AND function gates 62, 62' by lines 63, 63'. The DC restore clock signal $\phi R$ output of clock 25 is applied to one input terminal of gates 62, 62' through clock leads 67, 67' respectively while the multiplexing clock pulses $\phi SH_{1,3}$, $\phi SH_{2,4}$ are input to a second input terminal of gates 62, 62' through clock leads 68, 68' respectively.

Lines 54, 54' are tapped between multiplexers 58, 58' and capacitors 59, 59' respectively by lines 69, 69', lines 69, 69' being coupled to the $-$ and $+$ terminals of a suitable amplifier 70. The output terminal of amplifier 70 of sensor correction circuit 49 is coupled by line 71 through resistor 72 to the reference voltage (Vref) line 51 between reference potential 50 and reset transistor 30 (seen in FIG. 1). Reference voltage line 53 couples reference potential 50 and reset transistor 30' directly.

To identify the current offset voltage in shift registers 1, 2, 3, 4, a dark or black image signal is generated, the signal being conveniently obtained by clocking registers 1, 2, 3, 4 for at least a predetermined number of times (i.e. 16) beyond the last image signal. Inasmuch as no intervening exposure takes place, the signal produced in registers 1, 2, 3, 4 has a voltage representative of the internal voltage in the shift registers, i.e. the offset voltage. Accordingly, after the last image signal has been clocked out from CCD 5, the black signals representing the current shift register offset voltages follow. A predetermined number of the black signals, i.e. sixteen, are input to sensor correction circuit 49 during the DC restore interval measured by clock pulse $\phi R$ to reset and update circuit 49.

Following completion of the image integration interval, the image charges in cells 13 of array 14 are transferred on transfer clock pulses $\phi T_1$, $\phi_2$ to the phase gates of shift registers 1, 2, 3, 4 as described heretofore. As a result, each shift register 1, 2, 3, 4 now has an image charge in every second phase gate, with the image charge position being offset by one in each shift register. For example, shift register 1 has image charges from cells 13-1, 13-5, 13-9, . . . in phase gates 1-1, 1-3, 1-5, . . . ; shift register 2 has image signals from cells 13-2, 13-6, 13-10, . . . in phase gates 2-1, 2-3, 2-5, . . . , shift register 3 has image signals from cells 13-3, 13-7, 13-11, . . . in phase gates 3-2, 3-4, 3-6, . . . etc. The image charges in shift registers 1, 2, 3, 4 are shifted serially along the shift registers 1, 2, 3, 4 by clock pulses $\phi_1$, $\phi_2$, $\phi_3$, $\phi_4$ to output gates 28, 28', sampled by sample and hold circuits 35, 35', amplified by amplifier 40, and output to line 41 in a single serial image signal stream as described.

As the image charges are shifted serially along shift registers 1, 2, 3, 4 from phase gate to phase gate toward the shift register output, the signals are replaced by a black signal representing the current offset voltage (if any) of the shift register. During the DC restore clock pulse $\phi R$, gates 62, 62' are enabled. With each sample and hold clock pulse $\phi SH_{1,3}$, $\phi SH_{2,4}$ during the restore interval, gates 62, 62' are alternately energized in timed synchronization with the output of the black signals to line 41. The signal outputs of gates 62, 62' to lines 63, 63' respectively trigger multiplexers 58, 58' in synchronization with the passage of the black signals to line 41, triggering of multiplexers placing the black signals, representing the current offset voltage, on capacitors 59, 59' respectively.

Amplifier 70 amplifies any difference in the signals applied to the − and + terminals thereof from capacitors 59, 59' and outputs a subtractive or additive voltage component to the potential in line 51 to either reduce or increase the potential (Vref) to reset transistor 30 for the upper bank of shift registers 1, 3. The adjustment of reference potential (Vref) to shift registers 1, 3 substantially equates the offset voltage in the upper bank of shift registers 1, 3 with the offset voltage in the lower bank of shift registers 2, 4 to negate any differences in offset voltage between the shift register banks.

While adjustment in the reference voltage (Vref) to the upper bank of shift registers 1, 3 is described herein, it will be understood that adjustment may be made in the reference voltage to the lower bank of shift registers 2, 4 instead.

Figure 4:
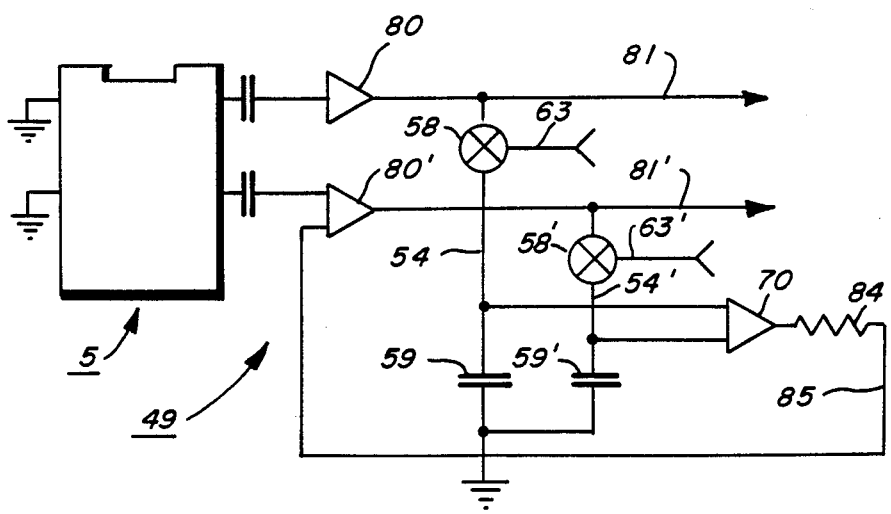
FIG. 4 is a logic schematic depicting an alternate embodiment of the sensor correction system of the present invention.

Referring to the embodiment shown in FIG. 4 of the drawings where like numerals refer to like parts, it is often desirable to perform image signal mulitplexing off the chip. Where off-chip multiplexing is desired, the separate image signal outputs of shift registers 1, 3 of the upper shift register bank and shift registers 2, 4 of the lower shift register bank are output through output amplifier pair 80, 80' to dual output lines 81, 81'. To accommodate this chip arrangement, the sensor correction system of the present invention has lines 54, 54' of sensor correction circuit 49 tapped into output lines 81, 81' respectively. The output of amplifier 70, representing the offset voltage correction factor (if any) is output through resistor 84 and line 85 to a second terminal of one of the output amplifiers, shown here as amplifier 80'. The offset voltage corrective factor, which may comprise either an additive or subtractive potential, is combined with the image signal output in line 81' to bring the offset voltage component of the image signals output through lines 81, 81' into substantial balance.

While the invention has been described with reference to the structure disclosed, it is not confined to the details set forth, but is intended to cover such modifications or changes as may come within the scope of the following claims.

I claim:

1. Offset correction means for neutralizing any differences in the shift register offset voltages of an image sensor having at least two discrete banks of parallel in/serial out shift registers for processing image signals generated by plural photosensitive elements of said sensor to provide at least one serial image signal output and a source of reference potential for input to said shift registers; the improvement comprising:
    (a) offset signal generating means for generating offset signals representing any offset potential in each of said banks of shift registers;
    (b) offset signal comparing means for comparing said offset signals to provide an offset correction potential;
    (c) means for summing said offset corrective potential with said reference potential to provide an adjusted reference potential; and
    (d) means for inputting said adjusted reference potential to at least one of said shift register banks to neutralize any differences in offset voltages in said shift register banks.

2. The offset correction means according to claim 1 including control means for actuating said offset correction means between scan lines to update said offset correction means.

3. The offset correction means according to claim 2 including:
    storage means for storing said offset signals pending the next update thereof.

4. The offset correction means according to claim 1 in which said sensor includes means for multiplexing the image signal outputs of said shift register banks to provide a common serial image signal output,
    said offset signal generating means generating said offset signals between scan lines,
    said sensor multiplexing means multiplexing said offset signals,
    said offset signal comprising means including,
    (a) first and second signal storage means for storing offset signals from each of said banks of shift registers,
    (b) means for coupling said output with said first and second signal storage means;
    (c) timing means for enabling said coupling means to input any offset signals to said first and second signal storage means between scan lines; and
    (d) a comparator having inputs coupled to each of said first and second signal storage means for comparing the offset signals in said storage means to provide said offset correction potential.

5. The offset correction means according to claim 1 in which said offset signal generating means generates said offset signals between scan lines,
    said offset signal comparing means including,
    (a) first and second storage means for storage means for storing offset signals from each of said banks of shift registers,
    (b) means for coupling the output of each of said shift register banks with said first and second signal storage means;
    (c) timing means for enabling said coupling means to input any offset signals to said first and second signal storage means between scan lines; and
    (d) a comparator having inputs coupled to each of said first and second signal storage means for comparing the offset signals in said storage means to provide said offset correction potential.

6. An offset correction control for a scanner of the type having plural image sensors arranged in at least one linear array and segregated into at least two discrete sensor groups, the sensors in each of said sensor groups forming at least one independent sensor subgroup; a parallel in-serial out shift register associated with each sensor sub-group for receiving image signals from the sensors; and means to provide a reference potential to said shift registers, comprising:
    (a) means to provide control signals representing any offset potential in said shift registers;
    (b) means for comparing the control signals from the shift register of one sensor group with the other to provide a correction potential; and
    (c) means for summing said correction potential with the reference potential input to the shift register of one sensor group to bring the offset potentials of the shift registers of each sensor group into substantial balance with one another.

7. The offset correction control according to claim 6 in which each of said sensor groups comprises at least two discrete sensor sub-groups.

8. A method for balancing any difference in offset potentials between the shift registers of an image sensor, wherein a reference potential is provided to at least one of said shift registers for processing the image signal output of said sensor, comprising the steps of:
   (a) generating a signal representing the offset potential in any of said shift registers;
   (b) comparing said signals to provide an offset correction potential; and
   (c) summing said offset corrective potential with said reference potential to provide a reference potential adjusted to substantially balance any difference between shift register offset potentials.

9. An offset correction method for a scanner having plural image sensors arranged in at least one linear row, first and second banks of parallel in-serial out shift registers for receiving image signals from alternate ones of said image sensors to provide a serial image signal output; and a source of reference potential for input to at least one of said first and second shift register banks for processing the image signal output of said shift registers, comprising the steps of:
   (a) generating an offset signal representing any current offset potential in said shift registers;
   (b) comparing the offset signal of said first shift register bank with the offset signal of said second shift register bank to provide a control signal; and
   (c) adjusting said reference potential in accordance with said control signal to correct the signal outputs of said first and second shift register banks for any differences in offset potential between the shift registers of said first and second shift register banks.

* * * * *